US006880158B1

(12) United States Patent
Basso et al.

(10) Patent No.: US 6,880,158 B1
(45) Date of Patent: Apr. 12, 2005

(54) NETWORK PROCESSOR SERVICES ARCHITECTURE THAT IS PLATFORM AND OPERATING SYSTEM INDEPENDENT

(75) Inventors: Claude Basso, Raleigh, NC (US); Philippe Damon, Carrboro, NC (US); Anthony Matteo Gallo, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,133

(22) Filed: Apr. 10, 2000

(51) Int. Cl.[7] .............................. G06F 3/00; G06F 9/44; G06F 9/46; G06F 13/00
(52) U.S. Cl. ....................... 719/321; 719/327; 719/328; 719/331
(58) Field of Search ................................. 719/321–328, 719/310, 331; 709/310, 321–327

(56) References Cited

U.S. PATENT DOCUMENTS 6,009,476 A  * 12/1999  Flory et al. ................. 709/324
6,604,136 B1 *  8/2003  Chang et al. ............... 709/223

FOREIGN PATENT DOCUMENTS

EP          0 620 693 A2     10/1994
JP          10-229445        8/1998    ............ H04M/3/00
JP          2000-032132      1/2000    ............ H04M/3/00
JP          2000-101577      4/2000    .......... H04M/12/24
WO          WO 97/27558      7/1997

OTHER PUBLICATIONS

Che–Liang Yang and Chen–Fn Yu, The Design and Implementation of a Service Logic Execution Environment Platform, IEEE, 1993, pp. 1911–1917, GTE Laboratories Inc., Waltham MA.

* cited by examiner

Primary Examiner—Thomas Lee
Assistant Examiner—Diem Cao
(74) Attorney, Agent, or Firm—Josh G. Cockburn; Dillon & Yudell LLP

(57) ABSTRACT

A system for providing a scalable processor and operating system independent network processor services architecture. The system includes a plurality of portable and individualized functional components representing particular segments of the control processor's device driver. The functional components, which include lower level and external APIs, carry out the various network processor functions such as the receipt and transfer of packets on the network, and other functions required by the control processor to communicate with and direct the network processor. The functional components are designed to be adaptable to the various types of processor architecture and operating systems available and to permit customers or developers to customize and expand the available network services.

14 Claims, 4 Drawing Sheets

NETWORK PROCESSOR SERVICES ARCHITECTURE THAT IS PLATFORM AND OPERATING SYSTEM INDEPENDENT

BACKGROUND OF THE INVENTION

1. Technical Field

The present invention relates in general to improved computer networks, and in particular to an improved network processor architecture. Still more particularly, the present invention relates to an improved distributed network processor architecture that supports individualized network processor services that are platform and operating system independent.

2. Background of the Invention

FIG. 1A shows a block diagram of a general communications network. The communications network includes switch (or router) 10 connected through a simple multiplex device (multiplexer) 11 to several workstations 13. Switch 10 is also connected to a control point 12, Internet 14 or some other form of Wide Area Network (WAN) 16, server 18, and a Local Area Network (LAN) 20. LAN 20 can be configured with an ethernet, token-ring or any other type of architecture, which might include many additional workstations. Those skilled in the art will understand that a great variety of combinations of such elements is possible in permutations of FIG. 1. In particular, some elements could be duplicated and others deleted. Multiplexer 11 is a conventional off-the-shelf device that selects one of the plurality of attached workstations and allows it to communicate with the switch. Control point 12 provides the interface between the switch 10 and a network administrator. Control point 12 may include a computer comprising a keyboard, control unit, display, etc.

Communications networks are continually evolving due to the growing demand for networks with larger bandwidth, lower latency and greater flexibility. Many limitations exist in traditional networks. For example, networks designed with custom design chips, which carry out specific network applications, are not easily adaptable and are unable to keep up with the constantly evolving requirements for improved technology. Network changes occurs constantly, while fabrication of each custom design chip typically takes several months. Also, networks implemented with general purpose processors are limited in performance by the speed of the processor.

Distributed network systems created with a network processor services architecture are quickly becoming the standard for routing information throughout both Intranet and Internet networks. FIG. 1B illustrates a typical network processor services architecture. Control processor 101, which may be synonymous with control point 12 of FIG. 1A, directs most of the processes of the system. Control processor 101 is coupled to a plurality of network processors 103 presented as distributed parallel network processors 103. Network processors 103 are specialized processor chips designed to process networking applications in real time. These processor chips are initialized and configured by the general purpose processors or control processor 101.

Network processor 103 receives frames, modifies them, and provides media interface for transmitting the frames out to switch fabric 105 or to control processor 101. Network processors 103 are designed to optimize network-specific tasks and provide exceptional bandwidth, throughput and distributed processing capabilities, while reducing latency. Network processors 103 receive and forward packets during network communication. The packets are routed via the network processor 103 on layers 2, 3, and 4 of network protocols. Network processors 103 and switch fabric 105 may exist as components of switch/router 10 illustrated in FIG. 1A. Network processors 103 read the addresses of the packets, translate the addresses based on protocol and route the packets to their correct destination. Switch fabric 105 allows interconnection of multiple network processors in a system.

Control processor 101 contains a high level intelligent protocol for controlling the flow of IP packets in the system. Control processor 101 is responsible for activating network processors 103. Control processor 101 also provides network processors 103 with address information, that identifies the destination of the frames. Network processor 103 has one or more multiple look-up tables, which it consults when a packet arrives to determine a forwarding destination for the packet.

While the use of a network processor architecture offers a flexile solution that helps to maximize bandwidth utilization and traffic flow, use of the architecture can be limited to specific processor types and operating systems. Presently, communications within the network processors architecture is processor and OS dependent. The network processor and control processor are tightly coupled with specific device drivers which operate as a unified functional block that is designed to interact with a particular processor hardware type and operating system.

The present invention recognizes that more flexible processor model of network processor products is desired. A network processor services architecture, which was capable of being implemented in a hardware and operating system independent manner would be a welcomed improvement. It would be further desirable if such a processor architecture was expandable to include other functional components, which may be customer specific or developer specific. These and other benefits are achieved by the present invention.

SUMMARY OF THE INVENTION

A system for providing a scalable processor and operating system independent network processor services architecture is disclosed. The system includes a plurality of portable and individualized functional components representing particular segments of the control processor's device driver. The functional components, which include lower level and external APIs, carry out the various network processor functions, such as the receipt and transfer of packets on the network and other functions required by the control processor to communicate with and direct the network processor. The functional components are designed to be adaptable to the various types of processor architecture and operating systems available and to permit customers or developers to customize and expand the available network services.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF ILLUSTRATIVE EMBODIMENT

The present invention may be executed in a variety of systems, including a variety of computers running under a number of different operating systems. The computer may be, for example, a personal computer, a network computer, a mid-range computer or a mainframe computer. In the preferred embodiment, the computer is utilized as a control point of a network processor services architecture within a local-area network (LAN) or a wide-area network (WAN).

Figure 1A:
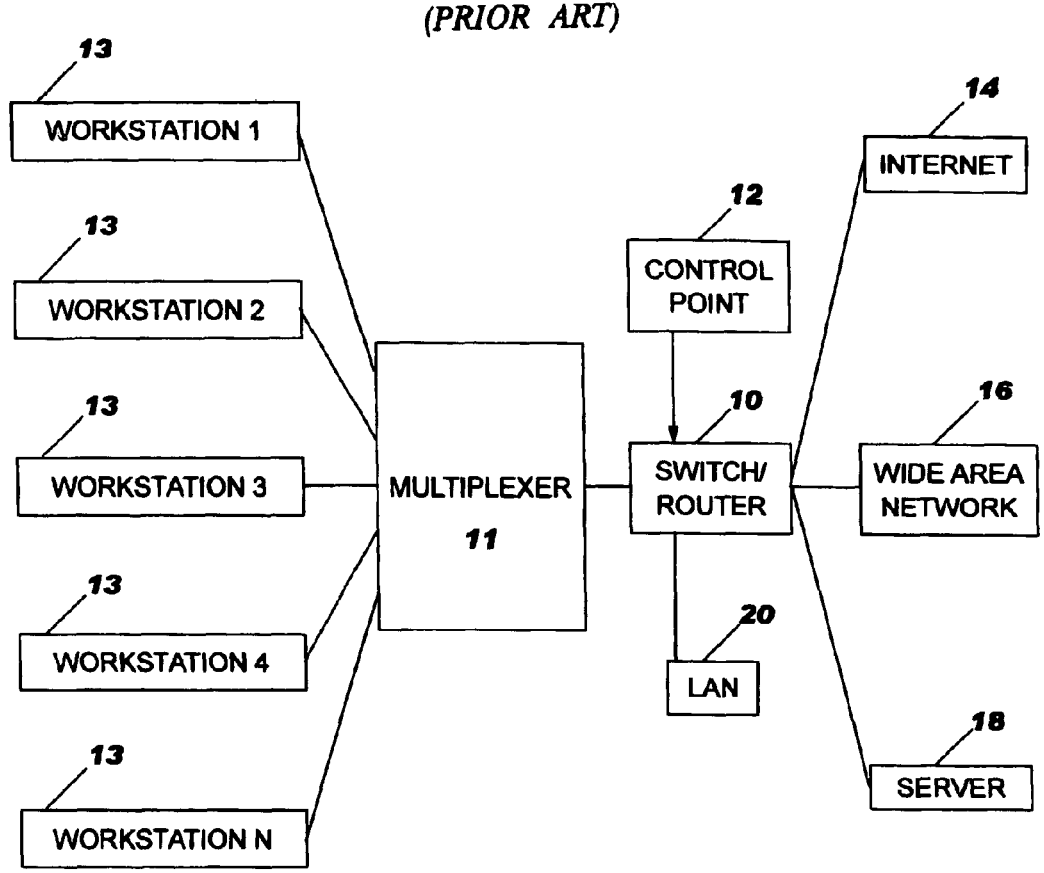
FIG. 1A depicts a conventional communications network in which a network processor architecture may operate.
Figure 1B:
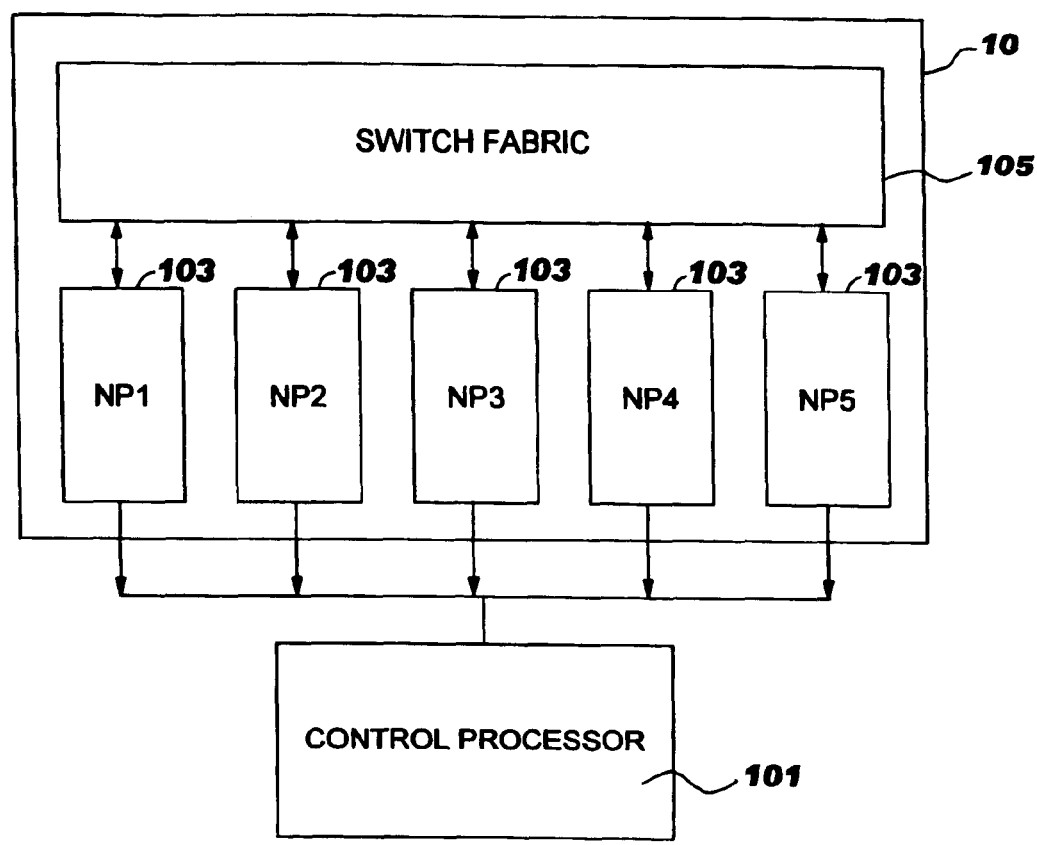
FIG. 1B illustrates a block diagram of basic components of a network processor architecture.
Figure 2:
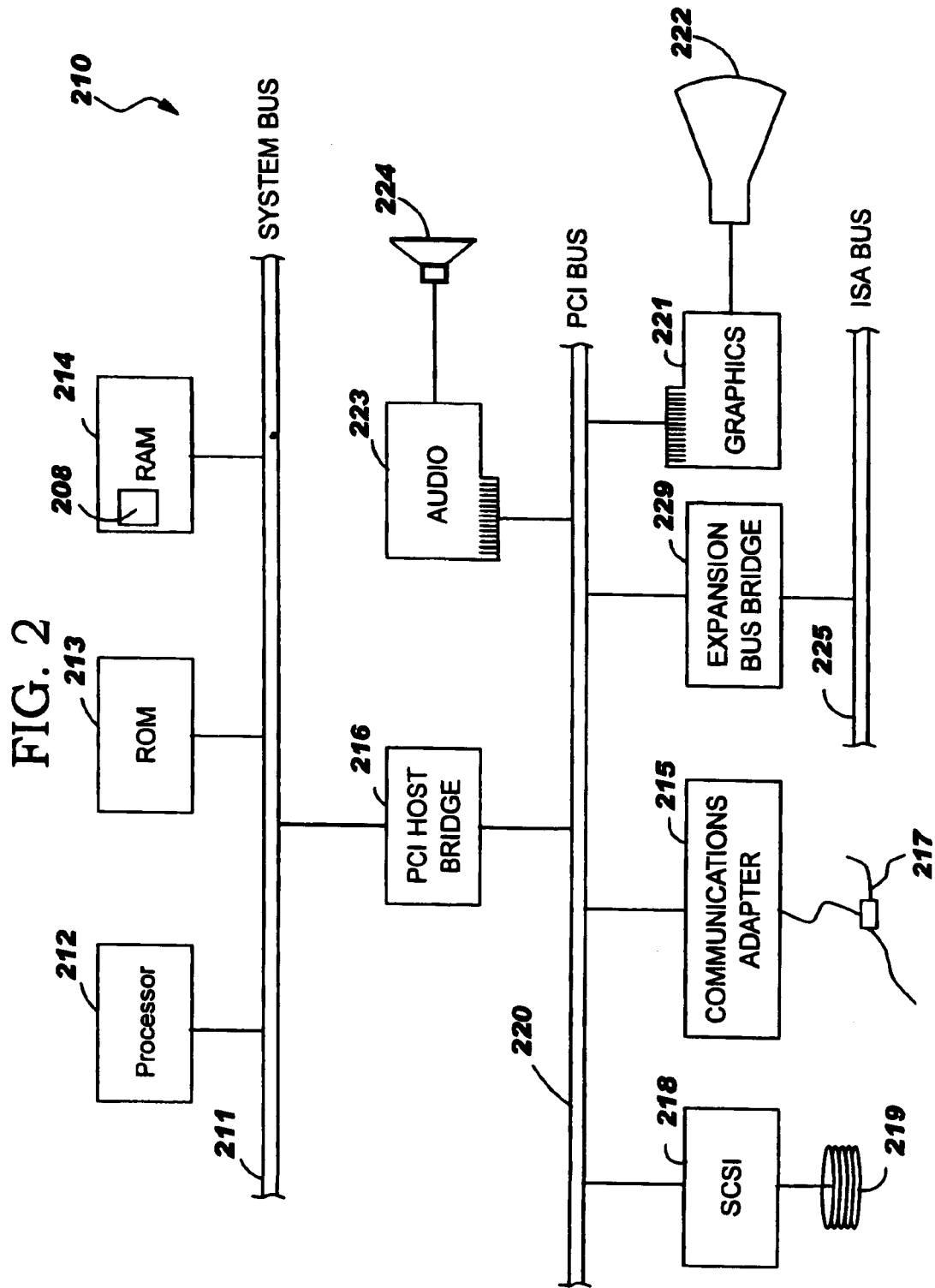
FIG. 2 depicts a block diagram of a computer system in which a preferred embodiment of the present invention may be implemented.

Referring now to the drawings and in particular to FIG. 2, there is depicted a block diagram of a typical computer system 210 that may be utilized as a control processor in a preferred embodiment of the present invention. As shown, processor (CPU) 212, Read-Only memory (ROM) 213, and Random-Access Memory (RAM) 214 are connected to system bus 211 of computer system 210. CPU 212, ROM 213, and RAM 214 are also coupled to Peripheral Component Interconnect (PCI) local bus 220 of computer system 210 through PCI host bridge 216. PCI Host Bridge 216 provides a low latency path through which processor 212 may directly access PCI devices mapped anywhere within bus memory and/or input/output (I/O) address spaces. PCI Host Bridge 216 also provides a high bandwidth path for allowing PCI devices to directly access RAM 214.

Also attached to PCI local bus 220 are communications adapter 215, small computer system interface (SCSI) 218, and expansion bus bridge 229. Communications adapter 215 is utilized for connecting computer system 210 to a network 217. SCSI 218 is utilized to control high-speed SCSI disk drive 219. Expansion bus bridge 229, such as a PCI-to-ISA bus bridge, may be utilized for coupling ISA bus 225 to PCI local bus 220. In addition, audio adapter 223 is attached to PCI local bus 220 for controlling audio output through speaker 224. In alternate embodiments of the present invention, additional peripheral components may be added.

Computer system 210 also preferably includes an interface such as a graphical user interface (GUI) and an operating system (OS) that reside within machine readable media to direct the operation of computer system 210. In the preferred embodiment, OS (and GUI) contains additional functional components which permit network processing components to be independent of the OS and/or platform. Any suitable machine-readable media may retain the GUI and OS, such as RAM 214, ROM 213, SCSI disk drive 219, and other disk and/or tape drive (e.g., magnetic diskette, magnetic tape, CD-ROM, optical disk, or other suitable storage media). Any suitable GUI and OS may direct CPU 212.

Further, computer system 210 preferably includes at least one network processor services architecture software utility (i.e., program product) that resides within machine readable media, for example a custom defined service utility 208 within RAM 214. The software utility contains instructions (or code) that when executed on CPU 212 interact with modified OS of the invention to execute at least one block of the functional utilities depicted in FIG. 3.

The invention provides a distributed network processor services architecture in which the control functions of the device driver within the control processor are created as portable, exchangeable and individual functional blocks or utilities. The functional blocks operate to provide a network processor services architecture that exhibits operating system and hardware independence. The invention thus provides a device driver functionality which is adaptable to (or usable in) any control processor or operating system environment to control the operation of the network processor.

More specifically, the invention provides a device driver program for a distributed processing system. The device driver program includes a plurality of individual system services programs (or utilities), which provide high level bi-directional communication between a software stack and each network processor. The invention is implemented conceptually as software, which is encoded on a chip or other computer readable medium and connected to the processor of a network control point (or control processor).

Figure 3:
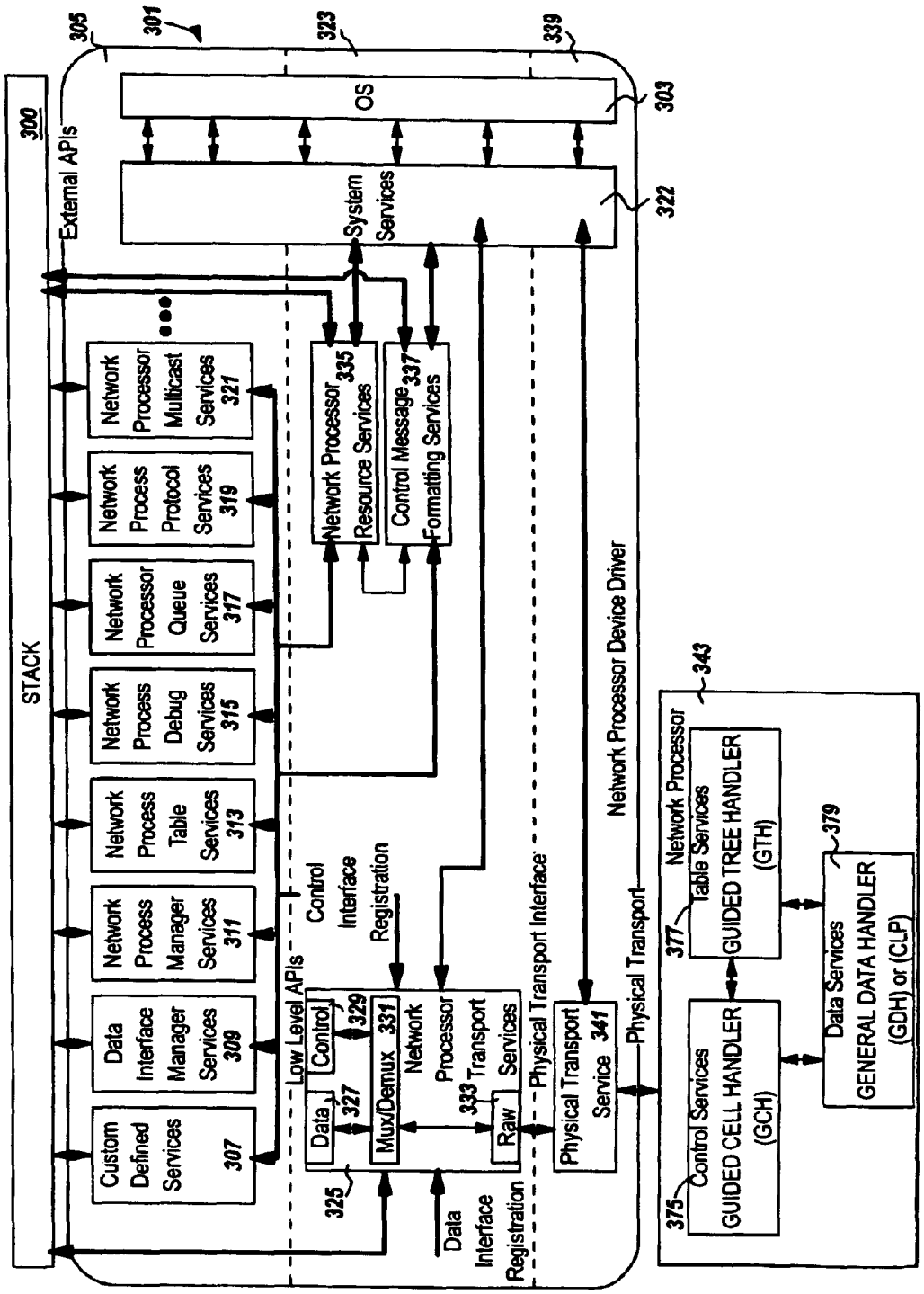
FIG. 3 depicts a high level block diagram representation of the functional components of a device driver within a control processor of a network processor services architecture in accordance with a preferred embodiment of the present invention.

Referring now to FIG. 3, a preferred implementation of the various processor services as individual functional component blocks is illustrated. As depicted the new configuration provides the separation (or isolation) of all system services of the control processor from the operating system, the separation (or isolation) of the physical transport services in order that the network processor code may reside on the CP, and scaleability in that the system processor services reside between the external and low level Application Programming Interface (APIs) and may be replaced or supplemented with new ones. The functional components are illustrated as blocks in FIG. 3 connected by interaction lines. In addition to the interaction lines shown, each of the scalable services can interact with one another. The blocks illustrated and their functionality are described below.

The network processor device driver 301 of FIG. 3 is illustrated with three levels of components, external APIs 303, low level APIs 323, and physical transport interface 339. Within each level are the functional blocks which represent the network processor services. Device driver 305 is the software component that attaches the NP hardware 343 to the software stack 300. Device driver 305 is responsible for being the interface between network processor 343 and the software stack 300. Device driver 305 initializes data structures required for interfacing with each of the interfaces. Thus, in the preferred embodiment, device driver 305 must also know the location of each network processor and know which ports are on which network processor.

DD 305 can be broken down into the upper layer API, Internal device drivers, and the lower level primitives. The upper layer APIs are similar to general APIs of the processor; however the internal structures and lower layer primitives are unique components. Lower layer primitives provides both a control path and a data path. Device Driver (DD) 305 provides the following functions:

1. Initialization of device structure for use by the software stack 300;
2. CP or carrier interface functions;
3. Frame receive and/or transmit functions; and
4. Control message transmit and/or receive.

The physical transport services (PTS) 341 transports the frames to the network processor 343. PTS 341 provides the base Send/Receive API to transmit data and control frames to and from Network Processor 343. This component isolates the higher layer services from the physical connection of the network processor. For example, PTS 341 for an embedded PowerPC within the network processor 343 would be different from and external PowerPC connected to the network processor via an ethernet cable. PTS 341 is coupled to network processor 343, network processor transport services 325, and operating system (OS) 303.

Network Processor 343 is connected to network processor device driver 301 of control processor. Each network processor 103 is a programmable, communications integrated circuit capable of performing one or more of the following functions: (1) packet classification (identifying packets based on known characteristics such as address or protocol); (2) packet modification (modifying the packet to comply with IP, ATM, or other protocols); (3) queue or policy management (packet queuing, de-queuing, and scheduling of packets for specific applications.); and (4) packet forwarding (transmission and receipt of data over the switch fabric and forwarding and routing the packet to appropriate address.). Within network processor 343, pico-code runs on Guided Cell handlers (GCH) 375, Guided Tree handlers (GTH) 377, and General Data handlers (GDH) 379. These software components are responsible for initializing the system, maintaining the forwarding paths, and managing the system.

Network processor 343 operates independent of and unaware of the architectural make-up of the network processor device driver 301 (i.e., the independent or individualized component blocks). All frames and control messages, etc. are translated (or decoded) within device driver 301 prior to being transmitted to the network processor 343 by the physical transport service 341. The translation enables seamless communication between the specific network processor, the operating system 303 and the internal components blocks. Likewise, any frames received from the network processor 343 are transcoded for use by the general service utility blocks of the network processor device driver 301.

During operation, the control processor communicates with each NP 343 using a control messaging protocol. Software architecture of NP low level and external APIs 323 and 301 supports bridging, routing, ATM, and multi-layer switching. The initialization phase of network processor 343 sets up the registers and memory regions of the processor chip and loads the code for GCH 375. GCH 375 prepares the chip to begin handling frames. To implement this, pico-code, which contains the code instructions used to forward each incoming frame, is loaded into the chip.

Network Processor Transport Services 325 is located above Physical Transport Services 341 and handles the specific Network Processor control and data encapsulation processing. Network processor transport services 341 further includes the following component blocks:

(1) Raw 333, which is an interface for connecting to the physical transport service 341

(2) Mux/Demux 331, a processing box (multiplexer) that encapsulates or de-encapsulates the Control and Data frames being sent to and from the NP 343.

(3) Data 327, which represents the generic data frames that may be modified to fit the network processor type; and (4) Control (or control message services) 329, which is the generic, internal control messages modified and utilized to maintain the state of the Network Processor 343.

Control message services 329 provides basic Network Processor initialization, configuration, code loading, event notification, debugger, diagnostic, and software action services for example. From the control services 329, one or more Network Processor 343 can be controlled in a given system.

The control message formatting services 337 is located in the lower level APIs 323 and is coupled to the external APIs 305, OS 323, software stack 300, and network processor resource services 335. Control message formatting services 337 is a messaging protocol utilized to exchange control messages between the control processor and the network processor 343. Control message formatting services 337 operate as an interpreter within the device driver 301. Control message formatting services 337 converts all low and high level APIs of various components into a specific language utilized by network processor 343. In the preferred embodiment, control message formatting services 337 is also responsible for converting an OS or hardware specific request into a general request applicable to any OS or hardware and vice versa, which is understood by the other components.

The primary portable functional utilities of the network processor device driver 301 exist in external APIs 305. These functional utilities may exist as firmware or software loaded in the RAM of the computer system or accessible through a computer readable medium. External APIs 305 provide access to and control over the underlying features of Network Processor 343. Network processor services APIs represent the services provided in each network processor subsystem and can be used as a common base to control one or more additional subsystems. The functional blocks or utility of external APIs 305 and their respective functions are provided below.

Custom Defined Services 307 represents a new component addable by a customer or developer based on his specific networking needs. It is conceivable that this element will greatly enhance the scalability of the processor services architecture implemented according to the present invention. Thus, other utilities may be included to expand or replace the external APIs 305 presented in FIG. 3 based on network design, customer needs and/or developer's preference. The APIs presented and described herein are done so solely for illustrative purposes and not meant to be limiting on the invention.

Interface Manager Services 309 may be utilized by developers to create and configure media ports (e.g., Ethernet, POS, and ATM) that will interface with protocol stacks. The ports are connectors on the system that manage, send and receive data within the network. The data is then processed by the network processor 343. In a preferred embodiment, interface manager services 309 also offers two additional features for integrating with the network processors 343. The first feature allows for creation of logical interfaces for receiving and transmitting frames that originate from and are destined for the system itself. Examples of these interfaces are Telnet, file transfer protocol (FTP), and simple network management protocol (SNMP) sessions. The second feature provides a high-speed, highly reliable, and high-bandwidth communications pipe for interprocess communications (IPC) among general purpose processors for systems that will make use of in-band forwarding services of the Network Processor based system.

Table Services 313 are a database of forwarding and/or control information on Network Processor 343. Network Processor 343 fundamentally supports full match, longest prefix match, and multifield classification trees. Table Services APIs 313 provide an application independent way to manage each of the table types. Table management consists of creation, initialization, purging and basic insertion, deletion, update, and query operations. Table services 313 can be utilized to develop applications that distribute control and topology information to one or more Network Processors 343.

Network Processor 343 contains a large number of queues that are used for basic chip operation and advanced scheduling functions. Queue Services APIs 317 allow access to these queues for setting and monitoring thresholds, guaranteeing minimum and maximum bandwidth, and creating and initialization of dynamic queues. Queue Services 317 may vary based on the version of network software running on Network Processor 343 and address issues such as Differentiated Services, ATM, and flow control. Like the interface manager services 309, queue services APIs 317 are designed to interface with an application stack 300.

Protocol services APIs 319 provide protocol stack interfaces for well-known protocols such as Bridging, IP, and MPLS, which Network Processors 343 are utilized to deploy. An example would be the IP Protocol APIs including IP Forwarding Table and ARP Table management. The protocol services APIs 319 provides APIs to control the behavior of the protocol forwarding code. For example, an API can control the default action that the code should take when a forwarding entry does not exist. This capability enables developers to program Network Processors 343 without having to modify the loading function of the network processors code.

Network Processor Multicast Services APIs 321 provide a way to allocate multicast resources within the Network Processor 343. These multicast resources define how a packet is replicated from the Network Processor 343 into the Switch Fabric and from the Network Processor 343 to the attached media ports.

For portability among different operating systems, the Network Processor Services relies on a set of system services APIs (or OS) 322 that is mapped to the native API services of the targeted operating system 303. System services APIs 322 operate in tandem with OS 303 and device driver 301 to provide dynamic portability of various external APIs 305, etc. to operate within the present hardware, firmware and software structure of network processor device driver 301. The present invention thus provides a way to easily port the Network Processor Services components by only modifying this one component. The system service API 322 allows OS 303 and processor independence by converting specific codes unique to that OS 303 and processor.

Extending across all three levels and interacting with each level and each functional block either directly or indirectly is the Operating System 303. Although the Network Processor Services APIs 305 are designed to be hardware-architecture and operating-system independent, it is necessary for each functional block which requires OS control and/or interaction to be capable of communicating with OS 303.

The present invention provides the decomposition of network processor services for a general-purpose processor into individual functional component blocks, which enables the network processor services to be operating system and hardware (processor) independent. The invention solves the problem of determining how to manage the network interfaces and how to decompose and fit the services into a system with existing and new interfaces by providing a unique device driver mechanism for managing a network processor. Use of functional component blocks makes it more flexile to add and remove new components by using generic services and layers along with an interpreter utility and a system services utility or OS. Those skilled in the art will appreciate the inherent benefits (or value) in decomposing network layers which were previously combined into component blocks and allowing for addition of additional functional utilities based on customer needs or network develop design.

It is also important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. In a distributed processing system, a method for providing scalable device driver services within a control system of a network processor services architecture, said method comprising the steps of:

in response to determining a desired network processor functionality, loading one or more of a plurality of functional components, wherein said one or more functional components provide the desired network processor functionality and wherein each of said plurality of functional components are independently selectable and provide a respective one of a plurality of network processor services;

providing at least one utility interposed between said one or more of said plurality of functional components and an operating system (OS) of said control system, wherein said at least one utility provides an OS-independent communication interface for said plurality of functional components and enables bi-directional communication between said network processor functionality and said OS;

wherein said providing step further provides a translation utility which translates all incoming and outgoing service requests into a common network processor language to permit seamless connection and correspondence between said one or more network processors, said operating system, and each of said functional components to enable handling of network packets; and in response to a receipt of a packet at said control system, first routing said packet through said utility, where said packet is decoded into a common code understandable by said OS and said one of said plurality of functional components, then handling said packet utilizing a selected one of said plurality of functional components, wherein said utility also converts all low and high level APIs of various components into a specific communication type utilized by the network processor functionality.

2. The method of claim 1, wherein said loading step includes the step of loading external application programming interfaces (APIs), low level APIs, and physical transport interfaces of a device driver.

3. The method of claim 2, further comprising the steps of:
loading a customer definable service component within said external (APIs) that includes a customer desired network service, which is operable within said network processor services architecture; and dynamically expanding available services to include said customer definable service component on-the-fly.

4. The method of claim 1, wherein said providing step includes the step of providing a bi-directional connection between said utility and said operating system, one or more network processors, and each of said functional components.

5. The method of claim 1, wherein said providing step further comprises the step of linking a system services utility to said operating system, wherein, said system services utility operates to allow each of said individual software coded components to communicate with said OS.

6. A computer program product for providing scalable device driver services within a control system of a network processor services architecture comprising:

a computer readable medium; and program instructions on said computer readable medium for:

implementing a plurality of individual software components that each provide a respective one of a plurality of network processor services;

providing at least one utility interposed between said plurality of individual software components and an operating system (OS) of said control system, that provide an OS independent communication interface for said plurality of individual software components;

wherein said program instructions for said providing step further includes program instructions for a translation utility, which translates all incoming and outgoing service requests into a common network processor language to permit seamless connection and correspondence between said one or more network processors, said operating system, and each of said functional components to enable handling of network packets; and in response to a receipt of a packet at said control system, first routing said packet through said utility, wherein said packet is translated into a code understandable by said OS and said one of said plurality of individual software components, than handling said packet utilizing one of said plurality of individual software components, wherein said utility also converts all low and high level APIs of various components into a specific communication type utilized by the network processor functionality.

7. The computer program product of claim 6, wherein program instructions for said loading step includes program instructions for loading external application programming interfaces (APIs), low level APIs, and physical transport interfaces of a device driver.

8. The computer program product of claim 7, further comprising program instructions for;

loading a customer definable service component within said external APIs that includes a customer desired network service, which is operable within said network processor services architecture; and dynamically expanding available services to include said customer definable service component on-the-fly.

9. The computer program product of claim 6, wherein said program instructions for said providing step includes instructions for providing a bi-directional connection between said utility and said operating system, one or more network processors, and each of said functional components.

10. The computer program product of claim 6, wherein said program instructions for said providing step further comprises instructions for linking a system services utility to said operating system, wherein, said system services utility operates to allow each of said individual software coded components to communicate said OS.

11. A control system of a network processor serves architecture comprising:

a plurality of individually loadable functional components within a device driver of said control system that each represents a network processor service;

at least one utility for enabling each of said functional components to communicate with an operating system (OS) of said control system, wherein, in response to a receipt of a request by said OS to perform a network processor function, said utility translates said request into a call of a particular one of said plurality of functional components that administers said network processor services of one or more network processors, wherein said utility is located within lower level APIs and is communicatively coupled to external APIs, OS, software stack, and a network processor resource services, and wherein said utility also converts all low and high level APIs of various components into a specific communication type utilized by the network processor functionality;

wherein said utility includes a translation utility, which translates all incoming and outgoing service requests into a common network processor language to permit seamless connection and correspondence between said one or more network processors, said operating system, and each of said functional components to enable handling of network packets; and processing hardware that executes code of said OS, said utility and said emotional components.

12. The system of claim 11, wherein said plurality of functional components includes external application programming interfaces (APIs), low level APIs, and physical transport interfaces of a device driver.

13. The system of claim 12, further comprising a customer definable service component within said external (APIs) that includes a customer desired network service, which is operable within said network processor services architecture, wherein available services are dynamically expandable to include said customer definable service component on-the-fly.

14. The system of claim 11, wherein said utility includes a system services utility coupled to said operating system that operates to allow each of said individual software coded components to communicate with said OS.

* * * * *